US011924376B2

(12) United States Patent
Anderson et al.

(10) Patent No.: US 11,924,376 B2
(45) Date of Patent: Mar. 5, 2024

(54) REMOTE EMERGENCY CALL INITIATION DURING REAL-TIME COMMUNICATIONS

(71) Applicant: Zoom Video Communications, Inc., San Jose, CA (US)

(72) Inventors: Walter F. C. Anderson, Santa Cruz, CA (US); Aaron Coffman, Denver, CO (US); Benjamin Joseph DeStephen, Hilliard, OH (US)

(73) Assignee: Zoom Video Communications, Inc., San Jose, CA (US)

( * ) Notice: Subject to any disclaimer, the term of this patent is extended or adjusted under 35 U.S.C. 154(b) by 28 days.

(21) Appl. No.: 17/515,210

(22) Filed: Oct. 29, 2021

(65) Prior Publication Data

US 2023/0137028 A1 May 4, 2023

(51) Int. Cl.
*H04M 3/51* (2006.01)
*H04M 3/42* (2006.01)

(52) U.S. Cl.
CPC ..... *H04M 3/5116* (2013.01); *H04M 3/42357* (2013.01)

(58) Field of Classification Search
None
See application file for complete search history.

(56) References Cited

U.S. PATENT DOCUMENTS

| 8,639,276 | B2* | 1/2014 | Sharpe | H04M 1/72451 455/461 |
| 9,369,294 | B2 | 6/2016 | Morin | |
| 9,396,645 | B2 | 7/2016 | Will et al. | |
| 9,491,277 | B2 | 11/2016 | Vincent | |
| 2005/0169439 | A1* | 8/2005 | Binning | H04L 12/2854 379/45 |
| 2007/0287409 | A1* | 12/2007 | Hwang | H04M 11/04 455/404.1 |
| 2008/0152112 | A1* | 6/2008 | Gayde | H04M 3/58 379/201.01 |
| 2008/0166992 | A1 | 7/2008 | Ricordi et al. | |

(Continued)

OTHER PUBLICATIONS

The Benefits and Challenges of Video Calling for Emergency Situations, Carman Neustaedter et al., School of Interactive Arts and Technology et al., Apr. 21-26, 2018, Montreal, QC, Canada, 14 pages.

*Primary Examiner* — Hemant S Patel
(74) *Attorney, Agent, or Firm* — Young Basile Hanlon & MacFarlane, P.C.

(57) ABSTRACT

An emergency call is initiated on behalf of a remote user by another software user who determines that the remote software user is experiencing an emergency event. During a real-time communication, a remote emergency alert is received from a first client device associated with a first user. The remote emergency alert identifies a second user associated with a second client device while the first client device and the second client device are in communication via real-time communication software. Based on location information determined for the second client device responsive to the remote emergency alert, an emergency call is initiated with a public safety answering point local to the second client device for indicating an emergency event associated with the second user to the public safety answering point on behalf of the second user.

20 Claims, 8 Drawing Sheets

(56) References Cited

U.S. PATENT DOCUMENTS

| | | | |
|---|---|---|---|
| 2013/0040599 A1* | 2/2013 | Berg | H04L 67/52 455/404.1 |
| 2014/0273915 A1* | 9/2014 | Corley | H04W 4/90 455/404.1 |
| 2016/0269535 A1* | 9/2016 | Balabhadruni | H04M 1/72424 |

* cited by examiner

REMOTE EMERGENCY CALL INITIATION DURING REAL-TIME COMMUNICATIONS

FIELD

This disclosure generally relates to emergency calling, and, more specifically, to initiating an emergency call on behalf of a remote client device user based on an emergency event determined over real-time communication software.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
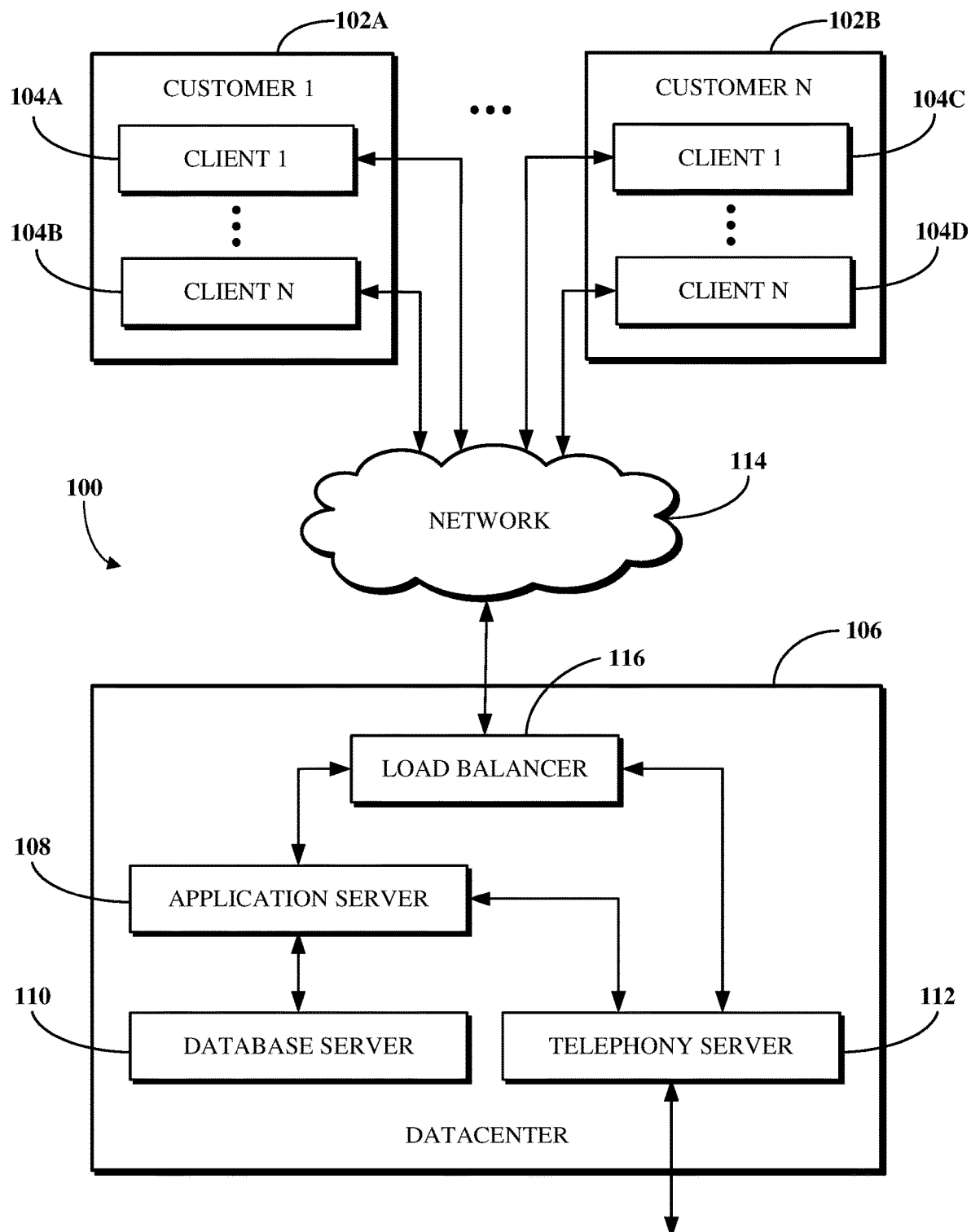
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them.

One type of system which addresses problems such as these includes a unified communications as a service (UCaaS) platform, which includes several communications services integrated over a network, such as the Internet, to deliver a complete communication experience regardless of physical location. In particular, remote users of a software platform, such as a UCaaS platform, may communicate with colleagues, friends, family, and others over communication software implemented by the software platform from the comfort of their homes or from other remote locations. For example, workers of an enterprise which maintains an account with the software platform may communicate with each other over video-enabled conferencing software whether those workers are in a known office location associated with the enterprise or a remote location.

Regardless of the quality of service of the communication software, there may be limited situations in which users being in the different locations presents an issue. One example is where a remote software user experiences an emergency event, such as a medical emergency which affects his or her cognitive abilities or consciousness. Such emergency events can unfortunately occur at any time. In some cases, a remote software user may experience an emergency event while participating in a real-time communication over communication software. If that remote user is alone at his or her location and is unable to call for emergency services on his or her own, emergency services may ultimately not arrive to deliver the necessary care to the user until it is too late.

Even where others participating in the real-time communication notice that the remote user is experiencing an emergency event, such as based on audio and/or video data captured at a device of the remote user and output through the communication software, those other users are generally unable to provide assistance unless they are in the same remote area and know the remote user's specific location. In particular, if another software user does not live nearby enough to the remote user who is experiencing the emergency event, dialing an emergency number (e.g., 911 or 111) will merely connect the other user to a public safety answering point (PSAP) local to the other user rather than a PSAP local to the remote user who is experiencing the emergency event. A PSAP which is not local to the remote user may not be able to dispatch emergency responders to the remote user.

However, even if another user knows the remote user's specific location, complications in indicating the emergency event to someone who can help to dispatch emergency services to the remote user's location may in some cases result in serious risk of health or death to the remote user. For example, it may take too long to dispatch emergency services to the remote user's location. It would thus be highly desirable to use communication software, or software usable by communication software, to enable users to initiate remote emergency alert processes for other users who experience emergency events.

Implementations of this disclosure address problems such as these by enabling an emergency call to be initiated on behalf of a remote software user by another software user who determines that the remote software user is experiencing an emergency event. During a real-time communication, a remote emergency alert is received from a first client device associated with a first user. The remote emergency alert identifies a second user associated with a second client device while the first client device and the second client device are in communication via real-time communication software. Based on location information determined for the second client device responsive to the remote emergency alert, an emergency call is initiated with a public safety answering point local to the second client device for indicating an emergency event associated with the second user to the public safety answering point on behalf of the second user.

To describe some implementations in greater detail, reference is first made to examples of hardware and software structures used to implement a remote emergency call initiation system. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server (e.g., a virtual machine). In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
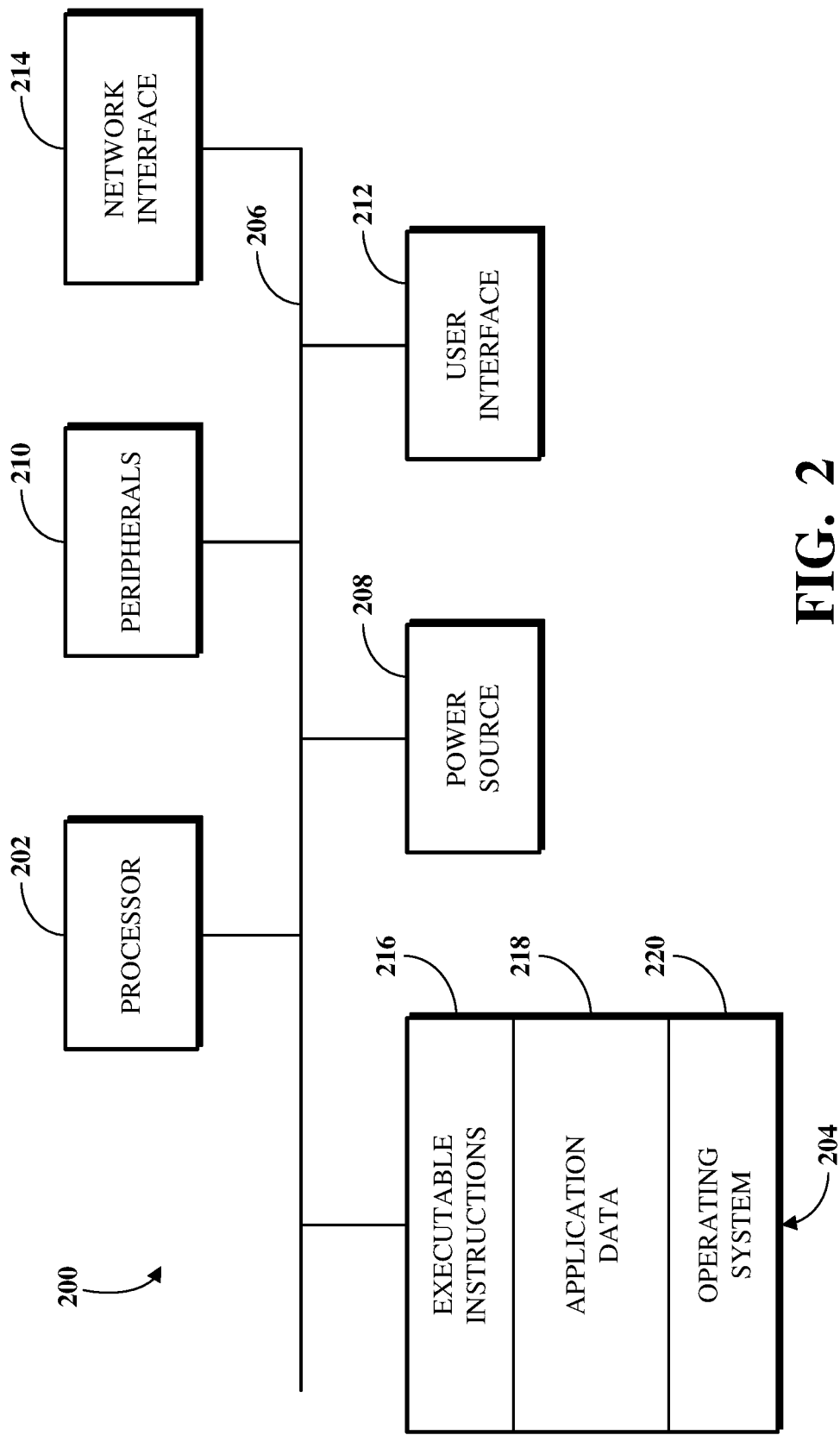
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
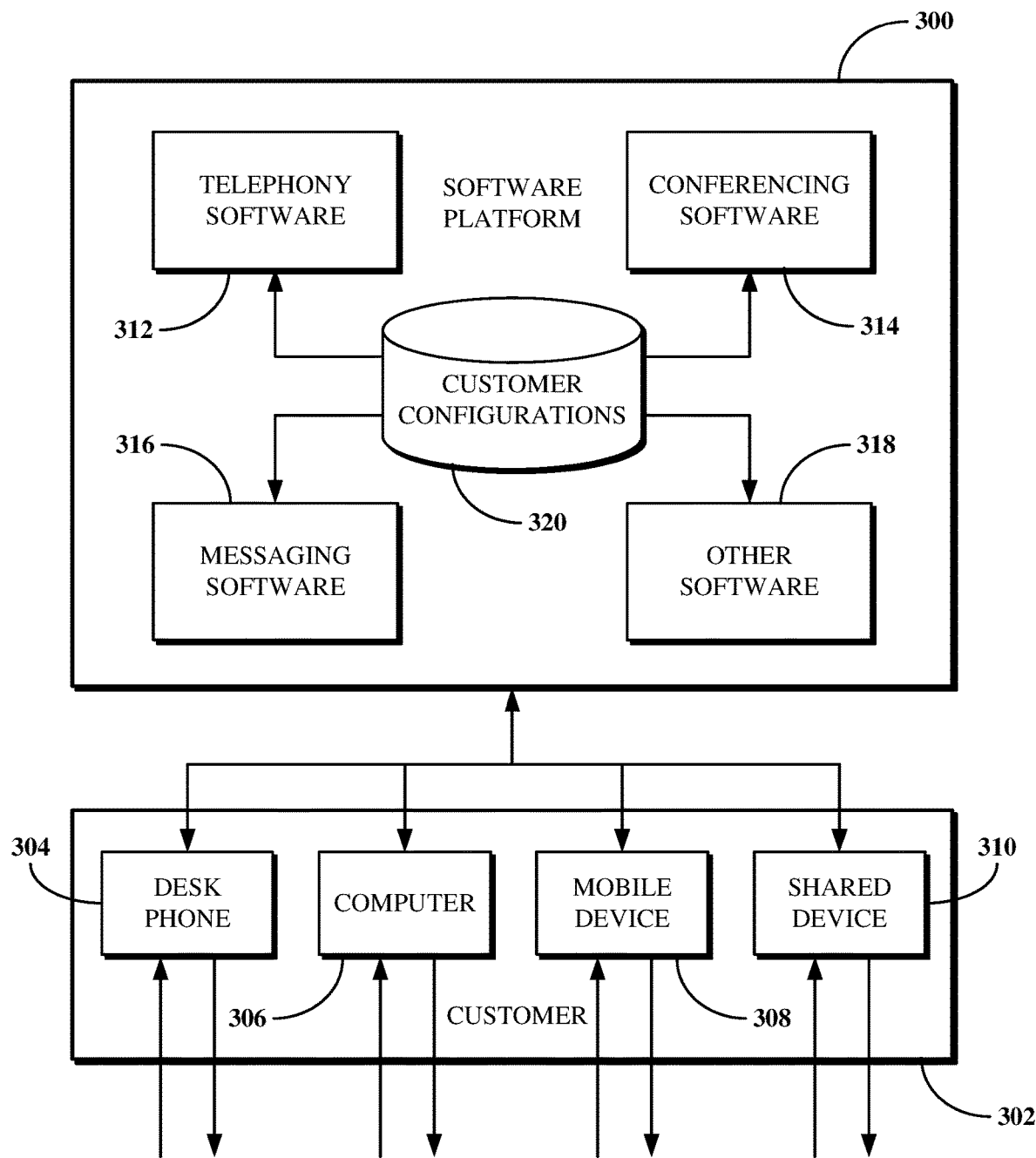
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for initiating emergency calls for remote client device users. In at least some such cases, the other software 318 can be included in one or more of the telephony software 312, the conferencing software 314, or the messaging software 316.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
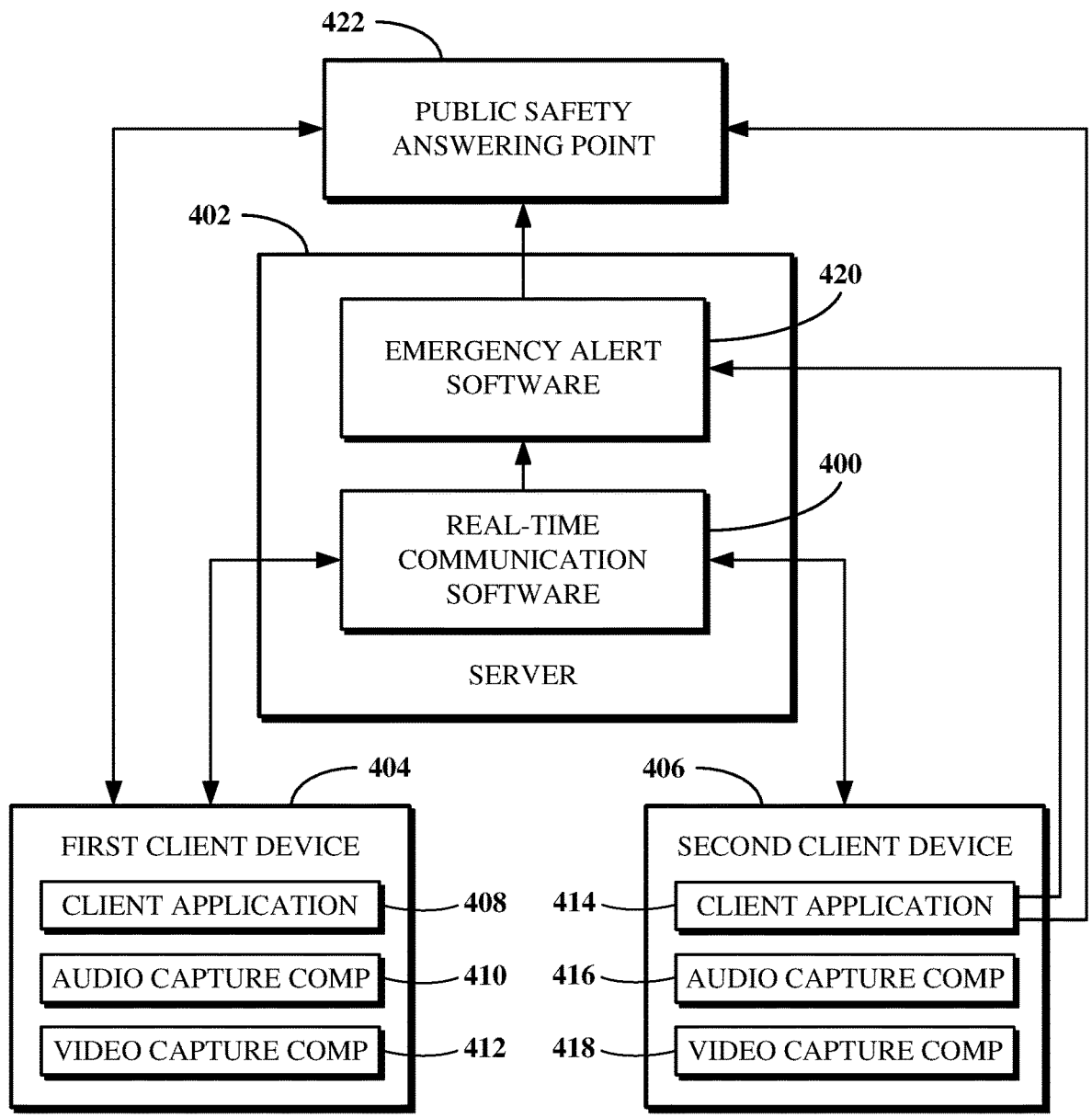
FIG. 4 is a block diagram of an example of a system for remote emergency call initiation during real-time communications.

FIG. 4 is a block diagram of an example of a system for remote emergency call initiation during real-time communications. The real-time communications are implemented using real-time communication software 400, which may, for example, be conferencing software, such as the conferencing software 314 shown in FIG. 3. The real-time communication software 400 is implemented on one or more servers, including a server 402, which may, for example, be one of the servers 108 through 112 shown in FIG. 1.

The real-time communication software 400 instantiates real-time communications, for example, video-enabled conferences, which users of client devices can connect to and communicate over. In particular, a real-time communication implemented using the real-time communication software 400 includes at least two participants communicating with one another over one or more modalities, such as text, audio, video, and/or other media. As shown, a first client device 404 and a second client device 406 are connected to the real-time communication software 400, and thus users of the first client device 404 and of the second client device 406 are communicating over a real-time communication implemented using the real-time communication software 400. Although two client devices 404 and 406 are shown, other numbers of client devices may connect to the real-time communication software.

Each of the client devices 404 and 406 includes hardware and software components for enabling the real-time communication. In particular, the first client device 404 runs a client application 408 and includes one or more audio capture components 410 and one or more video capture components 412, and the second client device 406 runs a client application 414 and includes one or more audio capture components 416 and one or more video capture components 418. The client applications 408 and 414 are software configured to connect with the real-time communication software 400. The client applications 408 and 414 may, for example, be the same client application running at different devices, or different versions thereof. The audio capture components 410 and 416 can include one or more microphones, microphone arrays, and/or other components configured for audio capture. The video capture components 412 and 418 can include one or more cameras and/or other components configured for video capture.

Using the various software and hardware components 408 through 418, the users of the first and second client devices 404 and 406 can communicate using audio and/or video over the real-time communication implemented using the real-time communication software 400. At some point during the real-time communication, one of the users, for example, the user of the second client device 406 may experience an emergency event. For example, the user of the second client device 406 may suffer a heart attack, lose consciousness, suffer a debilitating fall, or otherwise experience some event which requires an emergency response by emergency services or other first responders. In such an event, emergency alert software 420 running on the server 402 or a different server enables an emergency call to be placed to a PSAP 422 local to the second client device 406 and for the user of the first client device 404 and/or a user of another device to coordinate an emergency response with the PSAP 422 on behalf of the user of the second client device 406.

Provided the user of the second client device 406 has opted into allowing emergency calls to be placed on his or her behalf, the remote emergency call process is initiated by the user of the first client device 404. In particular, the emergency call process is initiated by the server 402 receiving a remote emergency alert identifying the user of the second client device 406 from the first client device 404. The remote emergency alert is transmitted from the first client device 404 to the server 402 in response to the user of the first client device 404 interacting with a user interface element presented within the client application 408. For example, the user interface element may be a software button or link selectable in connection with a list of participants of the real-time communication. In such a case, the user of the first client device 404 can select the user of the second client device 406 from or an element next to or nearby the name of the user of the second client device 406 within the list of participants to transmit the remote emergency alert and thus initiate the remote emergency alert process.

In response to the user of the first client device 404 initiating the remote emergency call process on behalf of the user of the second client device 406, the real-time communication software 400 transmits a prompt to the second client device 406, such as through the client application 414. The prompt indicates to the user of the second client device 406 that someone has initiated an emergency call process on behalf of the user of the second client device 406. In some cases, the prompt may identify the person who has initiated the emergency call process. The prompt includes a first selectable option for allowing the emergency call process to proceed and a second selectable option for declining the emergency call process. The user of the second client device 406 is given an opportunity to select one or none of the first selectable option or the second selectable option. If the user of the second client device 406 selects the first selectable option to allow the emergency call process to proceed or if the user of the second client device 406 does not select the second selectable option to decline the emergency call process within a threshold period of time (e.g., 10 seconds), the emergency call process proceeds. If the user of the second client device 406 selects the second selectable option to decline the emergency call process within the threshold period of time, the emergency call process ends without emergency services (e.g., the PSAP 422) being contacted.

In some implementations, where the user of the second client device 406 selects the second selectable option to decline the emergency call process within the threshold period of time, a secondary prompt may be output at the second client device 406 similar to the earlier prompt. The secondary prompt may ask the user of the second client device 406 to re-confirm that he or she wants to decline the remote emergency call process initiated on his or her behalf. For example, if the user of the second client device 406 re-confirms the declining of the remote emergency call process (e.g., by selecting a first selectable option within the secondary prompt), the remote emergency call process ends. However, if the user of the second client device 406 does not re-confirm the declining of the remote emergency call process (e.g., by selecting a second selectable option to cancel the earlier declining within the secondary prompt or by not selecting any selectable option within the secondary prompt within a threshold period of time), the remote emergency call process may proceed.

In some implementations, where the user of the second client device 406 selects the second selectable option to decline the emergency call process within the threshold period of time, a secondary prompt may be output at the first client device 404. For example, the secondary prompt output at the first client device 404 may inform the user of the first client device 404 that the user of the second client device 406 declined the remote emergency call process. The secondary prompt may provide an option for the user of the first client device 404 to re-start the remote emergency call process based. For example, if the user of the first client device 404 believes (e.g., based on video and/or audio from the second client device 406) that user of the second client device 406 is truly experiencing an emergency event such that the earlier remote emergency call process was declined in error, the user of the first client device 404 may use the secondary prompt to re-initiate the remote emergency call process on behalf of the user of the second client device 406.

Where the emergency call process proceeds, the emergency alert software 420 determines location information for the second client device 406. Because emergency services are handled locally, a PSAP local to the second client device 406 (i.e., the PSAP 422) is to be identified. The PSAP 422 is identified based on the location information determined for the second client device 406. The location information may be or correspond to location information input by the user of the second client device 406 (e.g., within the client application 414, the real-time communication software 400, and/or a software platform which includes the real-time communication software 400 such as the software platform 300 shown in FIG. 3), location information determined based on network information detectable using the client application 414, location information determined using a geolocation service accessible through a geolocation sensor or component of the second client device 406 (e.g., using Nomadic 911 services), location information accessible using an application programming interface (API) call to an external service such as external mapping software, or other location information as may be determined for the second client device 406.

The PSAP 422 is identified based on the determined location information. The emergency alert software then initiates an emergency call to the PSAP 422 using the client application 414 running on the second client device 406. In particular, the emergency call is initiated using the location information determined by or using the client application 414. In some cases, such as where the real-time communication software 400 and/or the emergency alert software 420 is operated by a PSTN carrier, the PSAP 422 can be identified before the emergency call is initiated 422. In other cases, the PSAP 422 may be identified by the PSTN carrier, such as by the signaling of the determined location information within the emergency call to the PSTN carrier.

The emergency alert software 420 initializes an emergency call, as a telephone call, for routing to the PSAP 422 over an enhanced emergency service, such as E911 and signals the location information for the second client device 406 within the emergency call for use by the PSAP 422. When the emergency all is connected with the PSAP 422, or before such connection, the emergency alert software 420 conferences the user of the first client device 404, as the person who initiated the emergency alert process, into the emergency call to enable the user of the first client device 404 to participate in the emergency call with the PSAP 422, such as to coordinate an emergency response on behalf of the user of the second client device 406. For example, the emergency alert software 420 can initialize a telephony aspect (e.g., a smartphone) of the client application 408 running on the first client device 404 to place the emergency call to the PSAP 422, or it can cause a separate SIP transaction with the first client device 404 to be initiated which will ultimately merge with the SIP transaction for the emergency call. In another example, the emergency alert software 420 may use a telephone number available for the user of the first client device 404 (e.g., based on input identifying that telephone number from the user of the first client device 404). In some implementations, the emergency call may be initiated using a telephony aspect (e.g., a smartphone) of the client application 414 running on the second client device 406 and the emergency alert software 420 may then conference in the user of the first client device 404 over that emergency call.

In some implementations, where the user of the second client device 406 has opted into allowing persons other than participants of a given real-time communication to participate in an emergency call process on his or her behalf, a person other than the user of the first client device 404 may be conferenced into the emergency call with the PSAP 422 on behalf of the user of the second client device 406 in addition to or instead of the user of the first client device 404. For example, where the user of the second client device 406 is associated with a customer of the software platform which includes the real-time communication software 400, a member of an internal safety team or other administrative team for the customer may be notified as to the emergency alert process being initiated on behalf of the user of the second client device 406. The member may be conferenced into the emergency call, either to coordinate an emergency response on behalf of the user of the second client device 406 or to monitor the emergency call without actively coordinating the emergency response.

In some implementations, where other participants are on the real-time communication with the user of the first client device 404 and the user of the second client device 406, initiating the emergency call may include limiting access to information of the emergency call to those other participants who are not participating in the emergency call with the PSAP 422. For example, where the real-time communication software 400 is conferencing software, such as the conferencing software 314 shown in FIG. 3, the user of the first client device 404 and the user of the second client device 406 may be automatically moved from a main communication channel of the conference into a private communication channel, such as a sub-conference (e.g., a breakout room), of the conference. The other participants may be prevented from accessing the private communication channel. The other participants may continue the conference while the user of the first client device 404 and the user of the second client device 406 are in the private communication channel. The private communication channel may be automatically closed upon the termination of the emergency call with the PSAP 422. Responsive to the private communication channel closing, the user of the first client device 404 and/or the user of the second client device 406 (to the extent he or she is capable) may be returned to the main communication channel for the conference such as to rejoin any other participants who remained the main communication channel during the emergency call. Alternatively, responsive to the private communication channel closing, the user of the first client device 404 and/or the user of the second client device 406 may be disconnected from the real-time communication software 400.

An emergency response can be coordinated with the PSAP 422 over the emergency call on behalf of the user of the second client device 406. In at least some cases, the emergency call may be maintained until emergency services arrive at the location of the user of the second client device 406. For example, the user of the first client device 404 may maintain a video and/or audio connection with the user of the second client device 406 over the real-time communication software 400 while the user of the first client device 404 is on the emergency call with the PSAP 422. The user of the first client device 404 may use that video and/or audio information to report updates regarding the user of the second client device 406 to the PSAP 422 until the emergency services arrive at the location of the user of the second client device 406. Once emergency services arrive thereat, the emergency call may be terminated.

In an example use case in which the real-time conferencing software 400 is conferencing software (e.g., the conferencing software 314 shown in FIG. 3), a conference may be conducted between multiple people including a user of the first client device 404 and a user of the second client device 406. The conference may be a video-enabled conference in which video data is obtained from each of the first client device 404 and the second client device 406 and is output for display at the client application 408 and the client application 414. During the conference, the user of the first client device 404 determines that the user of the second client device 406 may be experiencing an emergency event based on the video data obtained from the second client device 406 and output within the client application 408 (e.g., within a user interface tile associated with the user of the second client device 406). The user of the first client device 404 may access a participant list for the conference, find the name of the user of the second client device 406 on that list, and select to initiate an emergency process on behalf of the user of the second client device 406. The emergency alert software 420 prompts the user of the second client device 406 to indicate whether to allow or decline the emergency call within the client application 414 and proceeds as described above. Where there are other participants in the conference, the user of the first client device 404 and the user of the second client device 406 may be moved from a main communication channel of the conference to a private communication channel representing a sub-conference (e.g., a breakout room) during the emergency call with the PSAP 422. The client application 408 continues to output video data obtained from the second client device 406 during the emergency call so that the user of the first client device 404 can share updates regarding the user of the second client device 406 with the PSAP 422 until emergency responders arrive.

In an example use case in which the real-time communication software 400 is telephony software (e.g., the telephony software 312 shown in FIG. 3), a telephone call may be conducted between multiple people including a user of the first client device 404 and a user of the second client device 406. During the telephone call, the user of the first client device 404 determines that the user of the second client device 406 may be experiencing an emergency event based on the audio data obtained from the second client device 406 and output over the telephone call (e.g., within the client application 408). The user of the first client device 404 may access a participant list for the telephone call (e.g., within the client application 408 or using an integration by the client application 408 with other telephony software on the first client device 404), find the name of the user of the second client device 406 on that list, and select to initiate an emergency process on behalf of the user of the second client device 406. The emergency alert software 420 prompts the user of the second client device 406 to indicate whether to allow or decline the emergency call (e.g., within the client application 414) and proceeds as described above. The emergency alert software 420 initiates a new SIP transaction for the emergency call with the PSAP 422 and the second client device 406 and conferences in the user of the first client device 404. For example, the previous telephone call during which the emergency event was detected may either be put on hold or terminated during the emergency call. In another example, where other participants were on the telephone call, those other participants may remain within the telephone call (e.g., as a main communication channel) while the user of the first client device 404 and the user of the second client device 406 are moved to the emergency call (e.g., as a private communication channel).

In an example in which the real-time communication software 400 is software used by or within a contact center (e.g., as the conferencing software 314 or the telephony software 312), the real-time communication may be a contact center interaction between a contact center agent as a user of the first client device 404 and a user of the second client device 406. The contact center interaction may, for example, be a conference or telephone call as described above. During that contact center interaction, the contact center agent may determine that the user of the second client device 406 is experiencing an emergency event, as described above. The contact center agent may then initiate the emergency alert process on behalf of the user of the second client device 406, as described above, and the contact center agent may optionally be conferenced into the emergency call with the PSAP 422. Where the contact center agent is not conferenced into the emergency call with the PSAP 422, another person, such as an internal safety team member associated with an account used by the user of the second client device 406, may be conferenced into the emergency call.

Figure 5:
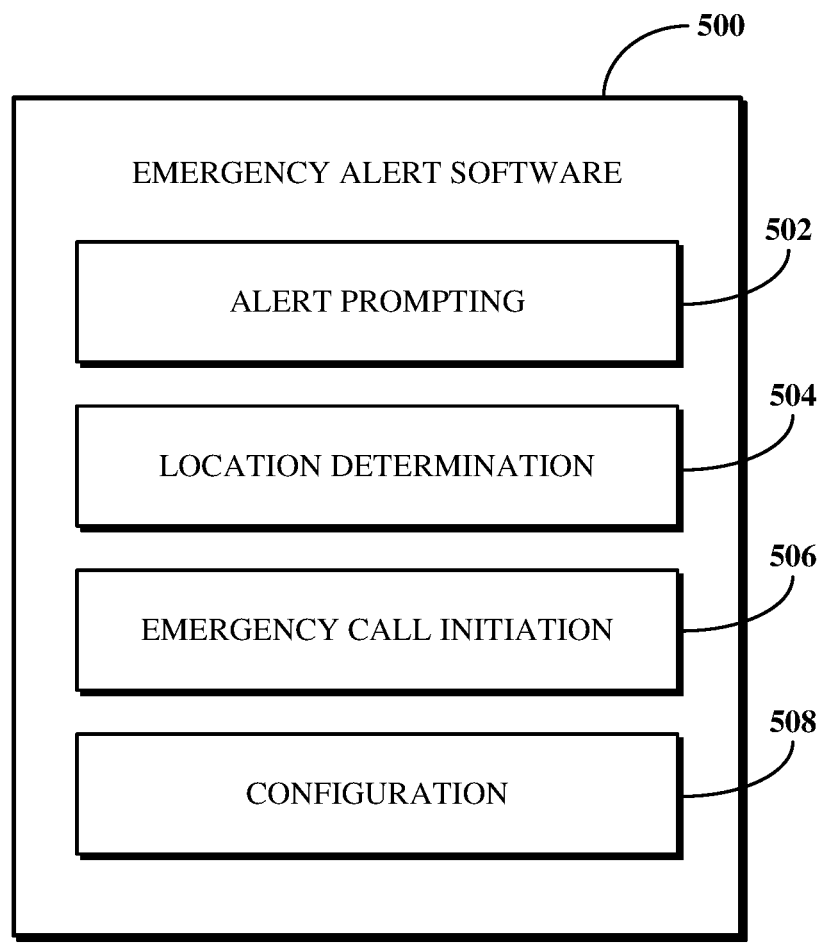
FIG. 5 is a block diagram of example functionality of emergency alert software.

FIG. 5 is a block diagram of an example functionality of emergency alert software 500. The emergency alert software 500 includes tools, such as programs, subprograms, functions, routines, subroutines, operations, and/or the like for facilitating a remote emergency alert process for a user of real-time communication software. As shown, the emergency alert software 500 includes an alert prompting tool 502, a location determination tool 504, an emergency call initiation tool 506, and a configuration tool 508.

The alert prompting tool 502 prompts a user of a second client device connected to the real-time communication software in response to an initiation of an emergency alert process on behalf of that user by a user of a first client device connected to the real-time communication software. For example, the initiation of the emergency alert process can be based on an emergency alert identifying the user of the second client device and received from the first client device. The alert prompting tool 502 causes a prompt, such as a window or similar user interface element, to be presented in a foreground of a display of the client device to ensure that the prompt is visible at the second client device. In some cases, the prompt may be flashing, change in size while output at the display, or otherwise be configured to attract visual attention. In some cases, audio may be output at the second client device while the prompt is output at the display thereof, such as to attract aural attention. The prompt is output at the display of the second client device for a threshold period of time. For example, a countdown timer may have a default or configurable value that defines the threshold period of time.

In some implementations, the alert prompting tool 502 may be configured to transmit the prompt to one or more devices instead of or in addition to the second client device. For example, where the real-time communication software or a software platform which includes the real-time communication software has access to information associated with the user of the second client device, that information can be processed to determine whether one or more devices other than the second client device have been used or registered for use by the user of the second client device with the real-time communication software or related software. For example, a user account with the software platform may store or otherwise identify other devices to which the user of the second client device has previously connected to software of the software platform. The one or more devices can include client devices such as the clients 304 through 310 shown in FIG. 3.

The location determination tool 504 determines location information for the second client device based on the prompt by the alert prompting tool 502 either being accepted or not being declined within the threshold period of time. The location information may include or otherwise refer to a specific address, including a street address (e.g., including a suite or room number, as applicable). Alternatively, the location information may include or otherwise refer to as specific of information as can be determined for the second client device. The location determination tool 504 can determine the location information for the second client device based on information derived from one or more sources.

Where the user of the second client device has registered account information including information indicative of his or her location with the real-time communication software and/or with a software platform which includes the real-time communication software, the location determination tool 504 can determine the location information based on that information. Alternatively, the location determination tool 504 can determine the location information based on network information associated with the second client device. The network information indicates one or more networks within some physical range of the second client device. The one or more networks may include public or private Wi-Fi networks, Bluetooth networks, and/or other networks to which a computing device could connect. The network information may in some cases also identify one or more devices which are connected to the network, such as by a public IP address and/or a subnet or private IP address for operator devices; a MAC address, port label, and/or port range of a network switch; and a basic service set identifier (BSSID) of a wireless access point.

The location determination tool 504 can cross-reference those identified networks and/or devices against records stored within a data store. For example, the location determination tool 504 may compare an identifier and/or other information associated with a network that the second client device is connected to or otherwise within range of against records associating network information and location information stored within the data store. A record stored within that data store may associate a physical address and/or other location information with one or more networks and/or devices. Where the data store includes an entry corresponding to an identified network or device, an address thereof can be retrieved from the data store. The location determination tool 504, given that the second client device is connected to a detected network or device or is otherwise in a detectable range of the network or device, may thus determine the location of the second client device based on the address retrieved from the data store. Where the data store does not include an entry corresponding to any of the identified networks or devices, the location determination tool 504 may push a new record therein for such a network or device including address information associated with geolocation information obtained from the geolocation component of the second client device (e.g., using an API to an external service, as described below).

As a further alternative, where the user of the second client device has opted into location sharing with his or her account used to access the real-time communication software, the location determination tool 504 can determine the location information through Nomadic 911 services. As yet a further alternative, the client application running on the second client device may integrate with external mapping software as part of the emergency alert process. For example, the location determination tool 504 can make or cause to be made an API call to external mapping software, such as Google Maps (e.g., where the second client device running the client application is other than in a known location). The API call to the external mapping software can use geolocation information obtained from the second client device to approximate a location of the second client device.

The emergency call initiation tool 506 initiates the emergency call. The emergency call is with a PSAP identified based on the location information determined by or otherwise using the location determination tool 504. The emergency call initiation tool 506 initiates the emergency call with the local PSAP using the client application running on the second client device. In particular, the emergency call initiation tool 506 interfaces with telephony software configured for use with the second client device (e.g., as a softphone accessible by or otherwise using the client application running on the second client device) to initiate a SIP transaction for the emergency call. The emergency call is then routed to the PSAP local to the second client device (e.g., by a PSTN carrier). The emergency call is processed, for example, as described above with respect to FIG. 1.

The emergency call initiation tool 506 then conferences the user of the first client device who initiated the emergency alert process on behalf of the user of the second client device into the emergency call with the local PSAP. The emergency call is initiated from the client application running at the second client device to enable the user of the second client device to participate in the emergency call in the event he or she becomes able to (e.g., where he or she regains consciousness during the emergency call). In some implementations, the emergency call initiation tool 506 may conference one or more others into the emergency call with the local PSAP, for example, a member of an internal safety team associated with an account of the user of the second client device.

In some implementations, the emergency call initiation tool 506, based on there being other participants within the real-time communication than just the user of the first client device and the user of the second client device, can instantiate or otherwise cause to be instantiated a private communication channel (e.g., as a breakout room) within the real-time communication software. The emergency call initiation tool 506 may then move or cause to be moved the user of the first client device and the user of the second client device from the main real-time communication into the sub-communication to limit exposure of emergency event information to those other participants. For example, moving the user of the first client device and the user of the second client device into the private communication channel from the main communication channel for the real-time communication can prevent or cause prevention of the other participants from over hearing private or otherwise personal information related to the subject emergency.

The configuration tool 508 uses configurations defined for users of client devices to determine how to handle emergency alert processes. The configurations may include or otherwise refer to one or more of a telephone number to use to conference users of client devices within an emergency call, an emergency contact to notify regarding an emergency event for a given user of a client device, or the like. The configurations may be defined by the users of the client devices, an internal safety team member associated with an account of a user of a client device, or both.

In some implementations, the emergency alert software 500 may present information indicative of one or more emergency contacts listed for the user of the second client device to the user of the first client device as part of the emergency call process. For example, a prompt may be presented at the client application running at the first client device to indicate those emergency contacts to the user of the first client device. In some such implementations, the prompt indicating the emergency contacts of the user of the second client device can include user interface elements (e.g., one-click buttons) configured to cause an indication of the emergency event to a selected emergency contact responsive to a selection of that emergency contact by the user of the first client device.

Although the tools 502 through 508 are shown as functionality of the emergency alert software 500 as a single piece of software, in some implementations, some or all of the tools 502 through 508 may exist outside of the emergency alert software 500 and/or the software platform may exclude the emergency alert software 500 while still including the some or all of tools 502 through 508 in some form elsewhere. For example, some or all of the tools 502 through 508 may be implemented real-time communication software, such as the real-time communication software 400 shown in FIG. 4.

In some implementations, the emergency alert software 500 can include tools other than or in addition to the tools 502 through 508. For example, the emergency alert software 500 can include an emergency detection tool. The emergency detection tool can use one or more machine learning models to detect an emergency event on behalf of a user of a client device participating in a real-time communication. For example, a machine learning model used by the emergency detection tool can use facial recognition, object detection, expression-based processing, or other intelligence to recognize certain gestures, facial expressions, body movements, or the like which are generally associated with emergency events. For example, a machine learning model can detect when a real-time communication participant clutches his or her heart. In response to detecting an emergency event, the emergency alert software 500 may use the alert prompting tool 502 to prompt the user of the subject client device as described above. The emergency alert software 500 may identify a host of the subject real-time communication as the user to conference into an emergency call should the emergency call process proceed based on the prompt.

In some such implementations, where a user of a client device is prone to emergency episodes, the user may input information indicative of his or her emergency episodes and/or behavior of the user during such an emergency episode for use in training a machine learning model used by the emergency detection tool. For example, the machine learning model can be trained to detect specific emergency events on behalf of specific users. In such a case, the emergency alert software 500 can use configurations defined with the configuration tool 508 to identify an emergency contact listed for such a user and transmit or cause to be transmitted information indicative of the emergency event to that emergency contact. For example, this emergency contact process can be performed in addition to the emergency call initiation process described above.

Figure 6:
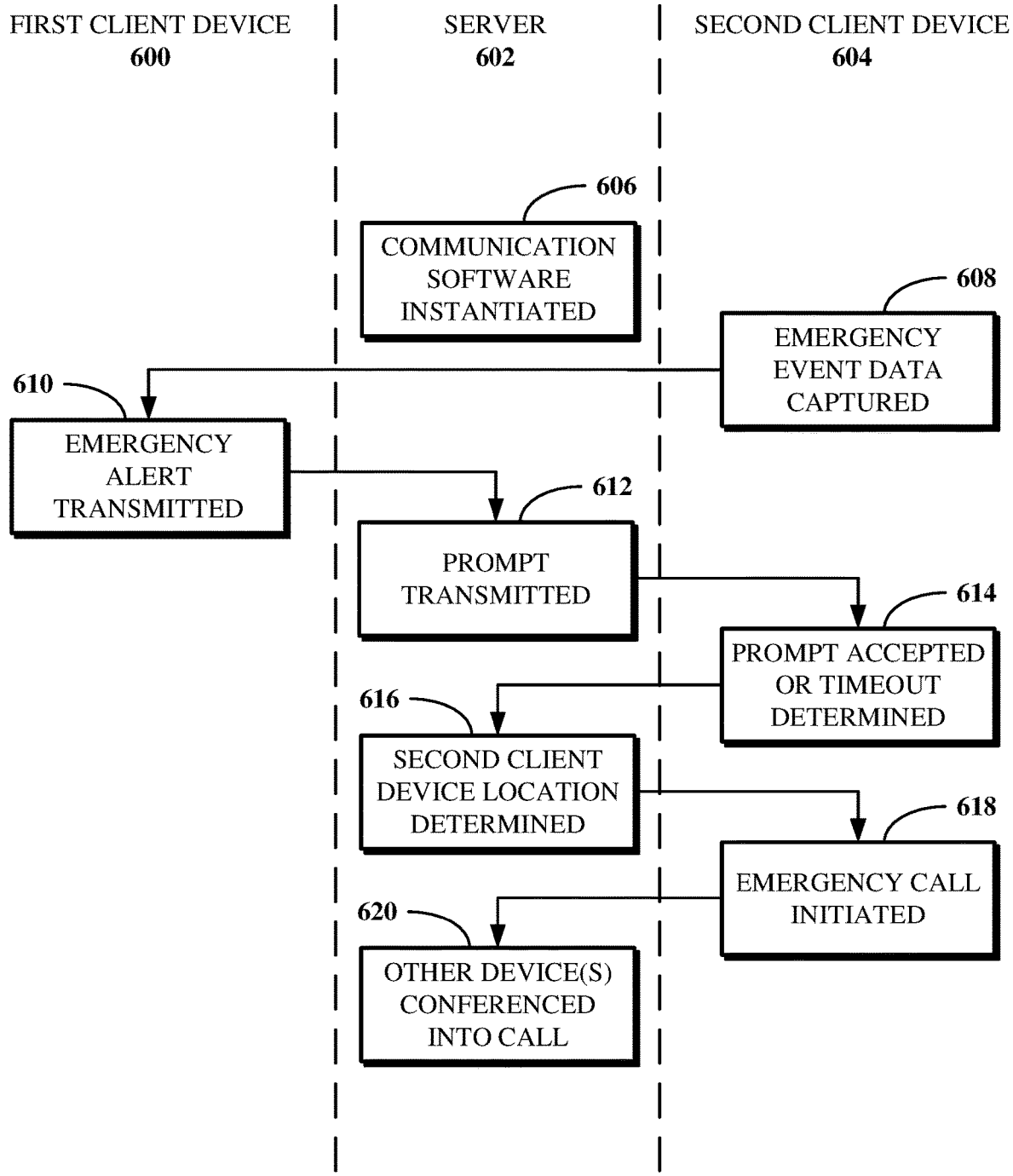
FIG. 6 is an illustration of swim lanes showing an example sequence of operations performed for remote emergency call initiation during real-time communications.

FIG. 6 is an illustration of swim lanes showing an example sequence of operations performed for remote emergency call initiation during real-time communications. In particular, the sequence of operations is between a first client device 600, a server, 602, and a second client device 604, which may, for example, respectively be the first client device 404, the server 402, and the second client device 406 shown in FIG. 4. At 606, real-time communication software is instantiated at the server 602. At 608, at some point during the real-time communication over the real-time communication software, emergency event data indicative of an emergency event experienced by a user of the second client device 604 is captured at the second client device 604. For example, the event data may be or be based on video and/or audio data received from the second client device 604. The event data is then transmitted through the server 602 to other participants of the real-time communication, including the user of the first client device 600. At 610, an emergency event is detected at the first client device 600 by a user of the first client device 600 based on the event data captured at the second client device 604 and a remote emergency alert is transmitted from the first client device based on the emergency event to initiate an emergency call process on behalf of the user of the second client device 604.

At 612, responsive to the user of the first client device 600 initiating an emergency call process on behalf of the user of the second client device 604 and thus based on an indication of the user of the first client device 600 initiating the emergency call process being received at the server 602, a prompt indicating the initiation of the emergency call process on behalf of the user of the second client device 604 is transmitted to the second client device 604. At 614, the prompt is either accepted by the user of the second client device 604 of a threshold period of time elapses without the user of the second client device 604 declining the emergency call through the prompt such that a timeout of the prompt occurs. In either case, the emergency call process proceeds.

At 616, location information for the second client device 604 is determined at the server 602. At 618, an emergency call is initiated at the second client device 604. The emergency call is routed to a PSAP local to the second client device 604 which is identified based on the location information determined for the second client device 604. At 620, one or more devices are conferenced into the emergency call to enable users of those other device (e.g., the first client device 600, an internal safety team or other administrative device, or both) to participate in the emergency call with the PSAP, such as by coordinating an emergency response for the emergency experienced by the user of the second client device 604 or to monitor the emergency call without actively coordinating the emergency response.

Figure 7:
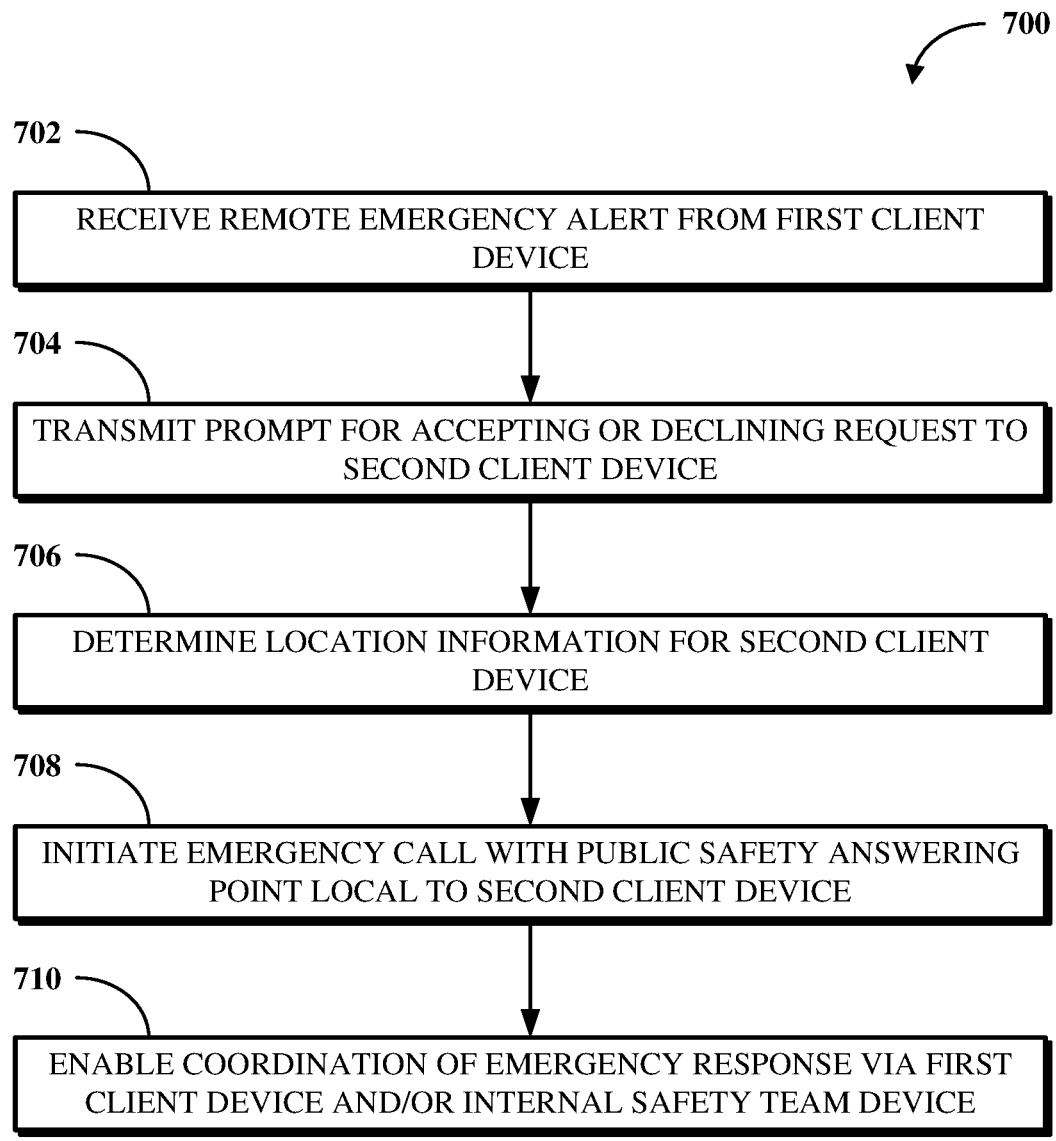
FIG. 7 is a flowchart of an example of a technique for remote emergency call initiation during real-time communications.
Figure 8:
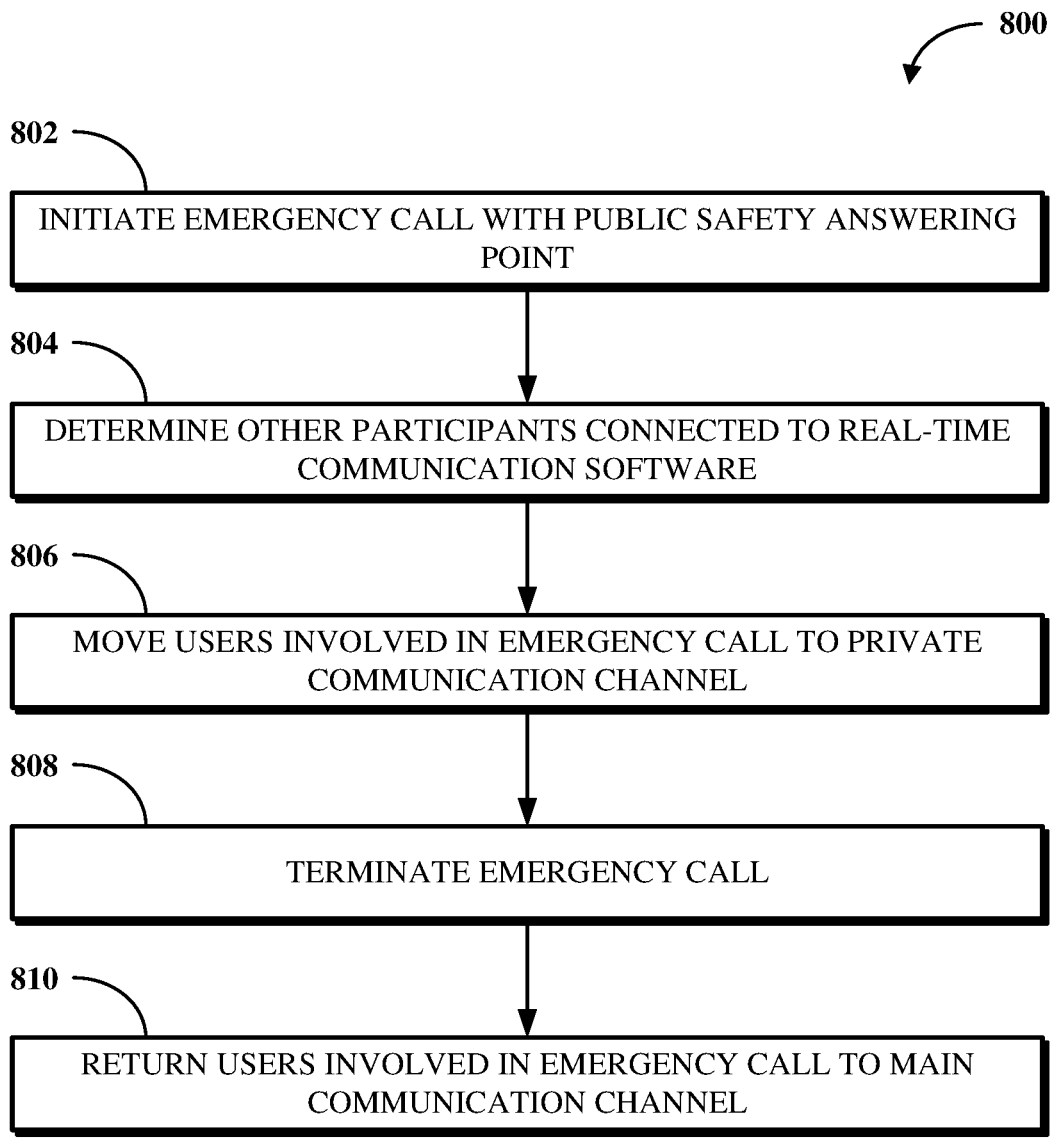
FIG. 8 is a flowchart of an example of a technique for limiting access to event data over communication software during a remote emergency call.

To further describe some implementations in greater detail, reference is next made to examples of techniques which may be performed by or using a remote emergency call initiation system. FIG. 7 is a flowchart of an example of a technique 700 for remote emergency call initiation during real-time communications. FIG. 8 is a flowchart of an example of a technique 800 for limiting access to event data during a remote emergency call.

The technique 700 and/or the technique 800 can be executed using computing devices, such as the systems, hardware, and software described with respect to FIGS. 1-6. The technique 700 and/or the technique 800 can be performed, for example, by executing a machine-readable program or other computer-executable instructions, such as routines, instructions, programs, or other code. The steps, or operations, of the technique 700 and/or the technique 800 or another technique, method, process, or algorithm described in connection with the implementations disclosed herein can be implemented directly in hardware, firmware, software executed by hardware, circuitry, or a combination thereof.

For simplicity of explanation, the technique 700 and the technique 800 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, the technique 700 for remote emergency call initiation during real-time communications is shown. At 702, a remote emergency alert is received from a first client device associated with a first user. The remote emergency alert initiates an emergency call process on behalf of a second user associated with a second client device. The remote emergency alert identifies the user of the second client device and is received while the first client device and the second client device are in communication via real-time communication software. For example, the remote emergency alert may be received responsive to a selection at the first client device of the second user within a participant list of the real-time communication software. The remote emergency alert may thus be data representing the output of that selection.

In some implementations, receiving the remote emergency alert can include detecting an emergency event experienced by the second user based on video data obtained from the second client device. For example, a machine learning model can be trained to detect certain behaviors, gestures, and/or the like to determine when a user connected to the real-time communication software may be experiencing an emergency event. In some such implementations, rather than the first user selecting the second user to transmit the remote emergency alert and thus initiate the emergency call process, the machine learning model running at the server or elsewhere may automatically select the second user to transmit the remote emergency alert based on the video data obtained from the second client device. In other such implementations, the first user may be prompted to verify that the second user appears to be experiencing an emergency event responsive to a detection of an emergency event by the machine learning model, and the remote emergency alert may be transmitted based on the interaction of the first user with that prompt.

At 704, a prompt for accepting or declining the emergency alert process is transmitted to the second client device. The prompt to accept or decline the remote emergency alert is transmitted to the second client device responsive to receiving the remote emergency alert. The prompt may be presented within a graphical user interface output at a display of the second client device. The prompt is configured (e.g., for display at the second client device) for a threshold period of time. The emergency call process proceeds, such as to initiate an emergency call, based on the remote emergency alert being accepted by the second user (e.g., based on a response to the prompt accepting the remote emergency alert being received within the threshold period of time) or based on a threshold period of time elapsing without the remote emergency alert being declined by the second user (e.g., based on a response to the prompt declining the remote emergency alert not being received within the threshold period of time).

At 706, location information for the second client device is determined. The location information for the second client device is determined responsive to the remote emergency alert, and, in particular, based on the emergency alert process proceeding based on the prompt transmitted to the second client device. The location information for the second client device may be determined in one or more ways. For example, the location information for the second client device may be determined based on network information identified by a client application running on the second client device. In another example, the location information for the second client device may be determined based on an application programming interface call from the second client device to external mapping software. In yet another example, the location information for the second client device may be determined based on information input within or otherwise available to the real-time communication software or a software platform which implements the real-time communication software.

At 708, an emergency call is initiated with a PSAP local to the second client device. The emergency call is initiated with the PSAP local to the second client device for indicating an emergency event associated with the second user to the public safety answering point on behalf of the second user. The emergency call is initiated using a client application running on the second client device. The location information for the second client device may be signaled within the emergency call to the PSAP. The emergency call may be between the PSAP and one or more devices. For example, the emergency call may be between the PSAP and a device associated with the first user, such as the first client device or another device. In another example, the emergency call may be between the PSAP and an internal safety team device associated with an account used by the second user. In yet another example, the emergency call may be between the PSAP and both of a device associated with the first user and an internal safety team device. The PSAP is determined based on the location information for the second client device. For example, the technique 700 can include determining the PSAP based on the location information for the second client device. In another example, the PSAP can be identified by a PSTN carrier based on the location information signaled within the emergency call.

At 710, coordination of an emergency response is enabled via the first client device and/or another device, such as an internal safety team device. Enabling the coordination of the emergency response includes allowing the first user and/or a user of an internal safety team device to communicate with the PSAP over the emergency call, such as to determine how to address the emergency event experienced by the second user. For example, where the real-time communication is a video conference, the first user may use video data from the second client device and output within a user interface of the real-time communication software to visually monitor the status of the second user and report updates accordingly to the PSAP while first responders are on their way to the location of the second user. In some implementations, as will be described below with respect to FIG. 8, the first user and the second user may be moved to a private communication channel for the emergency call based on the emergency call to the public safety answering point.

Referring next to FIG. 8, the technique 800 for limiting access to event data over communication software during a remote emergency call is shown. At 802, an emergency call is initiated with a PSAP. The emergency call is initiated based on an emergency call process, such as based on a remote emergency alert being received from a first user associated with a first client device and identifying a second user associated with a second client device. For example, the emergency call may be initiated with the PSAP as described above with respect to FIG. 7.

At 804, other participants connected to the real-time communication software are determined. In particular, the other participants are participants of a specific real-time communication instantiated using the real-time communication software. Determining the other participants includes determining that there are participants of the real-time communication other than just the first user and the second user. For example, the determination may be made based on a participant list for the real-time communication or other data available to the real-time communication software. The output of the determination may, for example, be a binary value.

At 806, users of client devices involved in the emergency call are moved to a private communication channel. The private communication channel may already exist prior to the emergency call being initiated. Alternatively, the private communication channel may be opened responsive to the determination that there are other participants connected to the real-time communication software, as described above. The users of the client devices involved in the emergency call include the first user and the second user. The first user and the second user are moved from a main communication channel of the real-time communication software to the private communication channel. For example, the real-time communication software or other software acting on its behalf can automatically move the first user and the second user into the private communication channel. In another example, the real-time communication software or other software acting on its behalf can transmit a prompt asking to move the first user and the second user to one or both of the first user or the second user and thereafter move the first user and the second user into the private communication channel based on a response to the prompt.

At 808, the emergency call is terminated. The emergency call may be terminated by the PSAP or another party to the emergency call (e.g., the first user). Terminating the emergency call includes terminating a SIP transaction used to facilitate the emergency call, such as by the PSAP or another party to the emergency call hanging up the emergency call. In some cases, the emergency call may not be terminated until after first responders arrive at the location of the second user.

At 810, the users of the client devices involved in the emergency call are returned to the main communication channel. The users of the client devices involved in the emergency call, which as described above include the first user and the second user, are returned to the main communication channel from the private communication channel responsive to the termination of the emergency call where the first user and the second user were previously moved into the private communication channel. In some implementations, only the first user is moved back into the main communication channel. For example, the second user may be automatically disconnected from the real-time communication software responsive to the termination of the emergency call (e.g., based on first responders arriving at the location of the second user). In some implementations, the first user may be given permissions to move freely between the private communication channel and the main communication channel, such as to provide updates as to the status of the second user to the other participants. For example, the first user may remain on the emergency call while moving back and forth between the main communication channel and the private communication channel.

The implementations of this disclosure correspond to methods, apparatuses, systems, non-transitory computer readable media, devices, and the like for initiating emergency calls based on remote emergency alerts. In some implementations, a method comprises receiving, from a first client device associated with a first user, a remote emergency alert identifying a second user associated with a second client device while the first client device and the second client device are in communication via real-time communication software; and initiating, based on location information determined for the second client device responsive to the remote emergency alert, an emergency call with a public safety answering point local to the second client device for indicating an emergency event associated with the second user to the public safety answering point on behalf of the second user. In some implementations, a non-transitory computer readable medium storing instructions operable to cause one or more processors to perform operations comprising receiving, from a first client device associated with a first user, a remote emergency alert identifying a second user associated with a second client device while the first client device and the second client device are in communication via real-time communication software; and initiating, based on location information determined for the second client device responsive to the remote emergency alert, an emergency call with a public safety answering point local to the second client device for indicating an emergency event associated with the second user to the public safety answering point on behalf of the second user. In some implementations, a system comprises a server device including a memory storing instructions and a processor configured to execute the instructions to receive, from a first client device associated with a first user, a remote emergency alert identifying a second user associated with a second client device while the first client device and the second client device are in communication via real-time communication software; and initiate, based on location information determined for the second client device responsive to the remote emergency alert, an emergency call with a public safety answering point local to the second client device for indicating an emergency event associated with the second user to the public safety answering point on behalf of the second user.

In some implementations of the method, non-transitory computer readable medium, and/or system, the emergency call is initiated using a client application running on the second client device.

In some implementations of the method, non-transitory computer readable medium, and/or system, the method comprises, the operations comprises, and/or the instructions include instructions for, responsive to receiving the remote emergency alert, transmitting a prompt to accept or decline the remote emergency alert to the second client device, wherein the emergency call is initiated based on the remote emergency alert being accepted or based on a threshold period of time elapsing without the remote emergency alert being declined.

In some implementations of the method, non-transitory computer readable medium, and/or system, the method comprises, the operations comprises, and/or the instructions include instructions for determining the location information for the second client device based on network information identified by a client application running on the second client device.

In some implementations of the method, non-transitory computer readable medium, and/or system, the method comprises, the operations comprises, and/or the instructions include instructions for determining the location information for the second client device based on an application programming interface call from the second client device to external mapping software.

In some implementations of the method, non-transitory computer readable medium, and/or system, the method comprises, the operations comprises, and/or the instructions include instructions for signaling the location information for the second client device within the emergency call to the public safety answering point.

In some implementations of the method, non-transitory computer readable medium, and/or system, the method comprises, the operations comprises, and/or the instructions include instructions for moving the first user and the second user to a private communication channel of the real-time communication software based on the emergency call to the public safety answering point.

In some implementations of the method, non-transitory computer readable medium, and/or system, the remote emergency alert is received responsive to a selection at the first client device of the second user within a participant list of the real-time communication software.

In some implementations of the method, non-transitory computer readable medium, and/or system, the emergency call is between the public safety answering point and a device associated with the first user.

In some implementations of the method, non-transitory computer readable medium, and/or system, the emergency call is between the public safety answering point and an internal safety team device associated with an account used by the second user.

In some implementations of the method, non-transitory computer readable medium, and/or system, the method comprises, the operations comprises, and/or the instructions include instructions for determining the public safety answering point based on the location information.

In some implementations of the method, non-transitory computer readable medium, and/or system, In some implementations of the method, non-transitory computer readable medium, and/or system, the method comprises, the operations comprises, and/or the instructions include instructions for moving the first user and the second user from a main communication channel of the real-time communication software to a private communication channel of the real-time communication software based on the emergency call; and returning the first user and the second user to the main communication channel from the private communication channel based on an end of the emergency call.

In some implementations of the method, non-transitory computer readable medium, and/or system, receiving the remote emergency alert comprises, operations for receiving the remote emergency alert comprise, and/or instructions to receive the remote emergency alert include instructions for detecting an emergency event experienced by the second user based on video data obtained from the second client device.

In some implementations of the method, non-transitory computer readable medium, and/or system, the method comprises, the operations comprises, and/or the instructions include instructions for transmitting a prompt configured for a threshold period of time to the second client device, wherein the emergency call is initiated based on a response to the prompt accepting the remote emergency alert being received within the threshold period of time or based on a response to the prompt declining the remote emergency alert not being received within the threshold period of time.

In some implementations of the method, non-transitory computer readable medium, and/or system, the method comprises, the operations comprises, and/or the instructions include instructions for, based on other participants being connected to the real-time communication software, moving the first user and the second user to a private communication channel for the emergency call.

In some implementations of the method, non-transitory computer readable medium, and/or system, the user of the first client device is a contact center agent and a real-time communication implemented using the real-time communication software is a contact center interaction.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving, from a first client device while the first client device and a second client device are connected to a video conference, a remote emergency alert indicating that a user of the second client device is experiencing an emergency event, wherein video data of the second client device is output for display at the first client device before the remote emergency alert is initiated; and initiating, based on location information determined for the second client device responsive to the remote emergency alert and while the video data of the second client device remains output for display at the first client device, an emergency call with a public safety answering point local to the second client device for indicating the emergency event to the public safety answering point on behalf of the user of the second client device.

2. The method of claim 1, wherein the emergency call is initiated using a client application running on the second client device.

3. The method of claim 1, the method comprising:
responsive to receiving the remote emergency alert, transmitting a prompt to accept or decline the remote emergency alert to the second client device,
wherein the emergency call is initiated based on the remote emergency alert being accepted or based on a threshold period of time elapsing without the remote emergency alert being declined.

4. The method of claim 1, the method comprising:
determining the location information for the second client device based on network information identified by a client application running on the second client device.

5. The method of claim 1, the method comprising:
determining the location information for the second client device based on an application programming interface call from the second client device to external mapping software.

6. The method of claim 1, the method comprising:
signaling the location information for the second client device within the emergency call to the public safety answering point.

7. The method of claim 1, the method comprising:
moving a user of the first client device and the user of the second client device to a private communication channel of the video conference based on the emergency call to the public safety answering point.

8. The method of claim 1, wherein the remote emergency alert is received responsive to a selection, at the first client device, of the user of the second client device within a participant list of the video conference.

9. The method of claim 1, wherein the emergency call is between the public safety answering point and a device associated with a user of the first client device.

10. The method of claim 1, wherein the emergency call is between the public safety answering point and an internal safety team device associated with an account used by the user of the second client device.

11. A non-transitory computer readable medium storing instructions operable to cause one or more processors to perform operations comprising:
receiving, from a first client device while the first client device and a second client device are connected to a video conference, a remote emergency alert indicating that a user of the second client device is experiencing an emergency event, wherein video data of the second client device is output for display at the first client device before the remote emergency alert is initiated; and
initiating, based on location information determined for the second client device responsive to the remote emergency alert and while the video data of the second client device remains output for display at the first client device, an emergency call with a public safety answering point local to the second client device for indicating the emergency event to the public safety answering point on behalf of the user of the second client device.

12. The non-transitory computer readable medium of claim 11, wherein the emergency call is initiated using a client application running on the second client device.

13. The non-transitory computer readable medium of claim 11, the operations comprising:
determining the public safety answering point based on the location information.

14. The non-transitory computer readable medium of claim 11, the operations comprising:
moving a user of the first client device and a user of the second client device from a main communication channel of the video conference to a private communication channel of the video conference based on the emergency call; and
returning the user of the first client device and the user of the second client device to the main communication channel from the private communication channel based on an end of the emergency call.

15. A system, comprising:
a server device including a memory storing instructions and a processor configured to execute the instructions to:
receive, from a first client device while the first client device and a second client device are connected to a video conference, a remote emergency alert indicating that a user of the second client device is experiencing an emergency event, wherein video data of the second client device is output for display at the first client device before the remote emergency alert is initiated; and
initiate, based on location information determined for the second client device responsive to the remote emergency alert and while the video data of the second client device remains output for display at the first client device, an emergency call with a public safety answering point local to the second client device for indicating the emergency event to the public safety answering point on behalf of the user of the second client device.

16. The system of claim 15, wherein the instructions to receive the remote emergency alert include instructions executable to:
detect the emergency event based on the video data of the second client device.

17. The system of claim 15, wherein the instructions include instructions to:
transmit a prompt configured for a threshold period of time to the second client device, wherein the emergency call is initiated based on a response to the prompt accepting the remote emergency alert being received within the threshold period of time or based on a response to the prompt declining the remote emergency alert not being received within the threshold period of time.

18. The system of claim 15, wherein the instructions include instructions to:
Based on other people being connected to the video conference, move a user of the first client device and a user of the second client device to a private communication channel for the emergency call.

19. The system of claim 15, wherein the emergency call is initiated using a client application running on the second client device.

20. The system of claim 15, wherein a user of the first client device is a contact center agent and the video conference is implemented for a contact center interaction.

* * * * *